United States Patent
Lavrenyuk et al.

(10) Patent No.: US 12,204,335 B2
(45) Date of Patent: Jan. 21, 2025

(54) SYSTEMS AND METHODS FOR CONTROLLING A ROBOTIC VEHICLE

(71) Applicant: YANDEX SELF DRIVING GROUP LLC, Moscow (RU)

(72) Inventors: Aleksey Viktorovich Lavrenyuk, Elektrostal (RU); Vitalii Vladimirovich Podkolzin, Moscow (RU); Oleg Mikhailovich Kirovsky, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 112 days.

(21) Appl. No.: 17/535,342

(22) Filed: Nov. 24, 2021

(65) Prior Publication Data

US 2022/0171396 A1    Jun. 2, 2022

(30) Foreign Application Priority Data

Nov. 30, 2020    (RU) .............................. 2020139230

(51) Int. Cl.
 *G05D 1/00*    (2024.01)
(52) U.S. Cl.
 CPC ......... *G05D 1/0214* (2013.01); *G05D 1/0223* (2013.01); *G05D 1/0231* (2013.01); *G05D 1/0255* (2013.01); *G05D 1/0257* (2013.01)
(58) Field of Classification Search
 CPC .. G05D 1/0214; G05D 1/0223; G05D 1/0231; G05D 1/0255; G05D 1/0257; G05D 2201/0213; B60W 30/18159; B60W 2050/0292; B60W 2556/50; B60W 2720/10; B60W 50/029; B60W 60/00186

USPC ......................................................... 701/26
See application file for complete search history.

(56) References Cited

U.S. PATENT DOCUMENTS

| | | | |
|---|---|---|---|
| 9,551,992 B1 * | 1/2017 | Barton-Sweeney | B60W 10/20 |
| 9,791,860 B2 | 10/2017 | Phillips et al. | |
| 10,099,372 B2 | 10/2018 | Vu et al. | |
| 10,599,137 B2 | 3/2020 | Dai et al. | |

(Continued)

FOREIGN PATENT DOCUMENTS

| | | | |
|---|---|---|---|
| CN | 115257401 A | * 11/2022 | |
| DE | 102014208666 A1 | * 11/2015 | B60W 30/08 |

(Continued)

OTHER PUBLICATIONS

Russian Search Report dated Dec. 5, 2022 issued in respect of the counterpart Russian Patent Application No. RU 2020139230.

(Continued)

*Primary Examiner* — Marc Burgess
*Assistant Examiner* — Merritt E Levy
(74) *Attorney, Agent, or Firm* — BCF LLP

(57) ABSTRACT

A system and a method for controlling movement of a robotic vehicle. The robotic vehicle comprises a computer system, a chassis controller, and a plurality of sensors. Data measured by the plurality of sensors is received by the computer system. A base trajectory and an emergency trajectory for the robotic vehicle are generated based on the data. During normal operations of the robotic vehicle the chassis controller causes the robotic vehicle to travel along the base trajectory. After determining that an error has occurred, the chassis controller causes the robotic vehicle to travel along the emergency trajectory.

18 Claims, 8 Drawing Sheets

(56) References Cited

U.S. PATENT DOCUMENTS

| | | |
|---|---|---|
| 2016/0090100 A1 | 3/2016 | Oyama et al. |
| 2016/0368491 A1* | 12/2016 | Hauler ............ B60W 60/00186 |
| 2017/0090476 A1 | 3/2017 | Letwin et al. |
| 2017/0108865 A1 | 4/2017 | Rohde et al. |
| 2017/0199523 A1* | 7/2017 | Barton-Sweeney ......................... B60W 30/0956 |
| 2017/0212513 A1* | 7/2017 | Iida ....................... B60W 30/09 |
| 2017/0291560 A1* | 10/2017 | Schroeder ................. B60T 8/92 |
| 2018/0052463 A1* | 2/2018 | Mays .................. B60W 60/007 |
| 2018/0364701 A1* | 12/2018 | Liu ...................... G05D 1/0088 |
| 2019/0235499 A1* | 8/2019 | Kazemi ................. G01S 17/931 |
| 2019/0384304 A1 | 12/2019 | Towal et al. |
| 2020/0021324 A1* | 1/2020 | Chiang ................ H04B 1/3888 |
| 2020/0047335 A1* | 2/2020 | Shang ...................... B25J 5/007 |
| 2020/0057447 A1* | 2/2020 | Kato ...................... B60W 30/16 |
| 2020/0086837 A1* | 3/2020 | Le Cornec ......... G01C 21/3407 |
| 2020/0156640 A1* | 5/2020 | Jonasson ............. B60W 30/143 |
| 2020/0189573 A1* | 6/2020 | King ................. B60W 30/0956 |
| 2020/0201324 A1* | 6/2020 | Darayan .............. G05D 1/0077 |
| 2020/0208998 A1* | 7/2020 | Xiang ..................... G06F 16/29 |
| 2020/0209848 A1* | 7/2020 | Mercep ..................... G07C 5/0841 |
| 2020/0211394 A1* | 7/2020 | King ................. G06V 20/58 |
| 2020/0406907 A1* | 12/2020 | Omari .................... G07C 5/008 |
| 2021/0046952 A1* | 2/2021 | Ju .......................... G07C 5/085 |
| 2021/0397187 A1* | 12/2021 | Korjus ................ G05D 1/0214 |
| 2022/0363276 A1* | 11/2022 | Wulf .............. B60W 30/18163 |

FOREIGN PATENT DOCUMENTS

| | | | |
|---|---|---|---|
| DE | 102014221682 A1 | 4/2016 | |
| RU | 2570982 C2 | 12/2015 | |
| RU | 2705885 C1 | 11/2019 | |
| WO | WO-2016142030 A1 * | 9/2016 | |
| WO | WO-2016172251 A1 * | 10/2016 | ........... B64C 39/024 |

OTHER PUBLICATIONS

European Search Report dated Mar. 31, 2022 issued in respect of the European Patent Application No. 21210891.4.

* cited by examiner

SYSTEMS AND METHODS FOR CONTROLLING A ROBOTIC VEHICLE

CROSS-REFERENCE

The present application claims priority to Russian Patent Application No. 2020139230, entitled "Systems and Methods for Controlling a Robotic Vehicle", filed Nov. 30, 2020, the entirety of which is incorporated herein by reference.

FIELD OF TECHNOLOGY

The present technology relates to robotic vehicles and, specifically, to a method for controlling movement of a robotic vehicle during a malfunction.

BACKGROUND

Various techniques may be used for providing navigation and/or control for robotic vehicles. These systems may use Global Positioning System (GPS) technologies or the like, computer vision algorithms, and/or artificial intelligence, among other technologies to control the robotic vehicle. In some instances, systems of the robotic vehicle may fail, causing the robotic vehicle to experience a hardware and/or software failure. When a failure occurs, the safety of the robotic vehicle, other vehicles and people located within its surroundings may be at risk. When a failure occurs, the robotic vehicle may stop in a dangerous location, such as at a road intersection.

U.S. Pat. No. 10,599,137 issued to ABB AG, on Mar. 24, 2020, discloses a safety control system having a control unit with safety control logic, a safety sensor arrangement, a machine arrangement operable in different operation modes, each operation mode having a different productivity, the control unit receiving and evaluating input from the safety sensor arrangement, and, in reaction to evaluation result(s), activating an operation mode determined by the safety control logic. The safety sensor arrangement has at least two functionally redundant subsystems, control unit input including information indicating availability of the functionally redundant subsystems. The control logic is configured to activate normal operation mode with normal productivity if input indicates availability of all subsystems, activate fail-stop operation mode with zero productivity if input indicates unavailability of all subsystems, activate fail-operate operation mode with productivity less than normal but above zero if input indicates at least temporary unavailability of at least one and availability of at least another one of the subsystems.

U.S. Pat. No. 9,791,860 issued to IRobot Defense Holdings Inc., on Oct. 17, 2017, discloses a method of operating a remote vehicle configured to communicate with an operator control unit (OCU) including executing a click-to-drive behavior, a cruise control behavior, and a retro-traverse behavior on a computing processor. The click-to-drive behavior includes receiving a picture or a video feed and determining a drive destination in the received picture or video feed. The cruise control behavior includes receiving an absolute heading and velocity commands from the OCU and computing a drive heading and a drive velocity. The retro-traverse behavior includes generating a return path interconnecting at least two previously-traversed waypoints of a list of time-stamped waypoints, and executing a retro-traverse of the return path by navigating the remote vehicle successively to previous time-stamped waypoints in the waypoints list until a control signal is received from the operator control unit.

U.S. Pat. No. 10,099,372 issued to VEO Robotics, Inc., on Oct. 16, 2018, discloses systems and methods to monitor a workspace for safety purposes using sensors distributed about the workspace. The sensors are registered with respect to each other, and this registration is monitored over time. Occluded space as well as occupied space is identified, and this mapping is frequently updated.

SUMMARY

Developers of the present technology have appreciated at least one technical problem associated with the prior art approaches. Developers of the present technology have appreciated that robotic vehicles may be improved by preventing the robotic vehicles from stopping in an unsafe and/or inconvenient location. More specifically, developers have appreciated that it may be desirable to prevent the robotic vehicle from stopping in a location that could be dangerous for vehicles or inconvenient for pedestrians. A primary trajectory and an emergency trajectory may be generated for the robotic vehicle. During normal operations, the primary trajectory may be used to control the robotic vehicle. If a trigger event (such as a failure) occurs, the emergency trajectory may be used to control the robotic vehicle to an area where it may stop. The emergency trajectory may prevent the robotic vehicle from stopping in an unsafe or inconvenient location.

Embodiments of the present technology have been developed based on developers' appreciation of at least one technical problem associated with the prior art solutions. Therefore, developers have devised methods and systems for controlling movement of a robotic vehicle.

In a first broad aspect of the present technology, there is provided a method for controlling movement of a robotic vehicle, wherein the robotic vehicle comprises a computer system, a chassis controller, and a plurality of sensors, the method comprising: receiving, by the computing system, data measured by the plurality of sensors, wherein the data is representative of surroundings of the robotic vehicle; generating, by the computer system and based on the data, a base trajectory for the robotic vehicle; generating, by the computer system and based on the data, an emergency trajectory for the robotic vehicle; transmitting, by the computer system, the base trajectory and the emergency trajectory to the chassis controller; causing, by the chassis controller, the robotic vehicle to travel along the base trajectory; and after determining that a communication error has occurred between the computer system and the chassis controller, causing, by the chassis controller, the robotic vehicle to travel along the emergency trajectory.

In some embodiments of the method, determining that the communication error has occurred comprises determining that the chassis controller has not received data packets from the computer system for longer than a predetermined threshold time period, or that the chassis controller has received a predetermined volume of corrupted data packets from the computer system.

In some embodiments of the method, the method further comprises, after determining that the communication error has occurred, reducing a speed of the robotic vehicle.

In some embodiments of the method, reducing the speed of the robotic vehicle comprises maintaining the robotic vehicle below a predetermined maximum speed.

In some embodiments of the method, causing the robotic vehicle to travel along the emergency trajectory comprises causing the robotic vehicle to travel based on a subset of the plurality of sensors.

In some embodiments of the method, the subset of the plurality of sensors comprises at least one accelerometer, at least one odometry sensor, and at least one ultrasonic sensor.

In some embodiments of the method, the plurality of sensors comprises a LiDAR sensor, a radar sensor, and a camera.

In some embodiments of the method, the method further comprises generating an updated emergency trajectory each time the base trajectory is updated.

In some embodiments of the method, the method further comprises generating, at a predetermined interval of time, an updated emergency trajectory.

In some embodiments of the method, the predetermined interval of time is adjusted based on a current location of the robotic vehicle.

In some embodiments of the method, the predetermined interval of time is shortened after a determination that the robotic vehicle has entered a roadway.

In some embodiments of the method, generating the emergency trajectory comprises determining that the robotic vehicle is in an intersection, and determining a path that exits the intersection, wherein the emergency trajectory comprises the path.

In some embodiments of the method, the emergency trajectory comprises one or more waypoints to be followed by the robotic vehicle, and wherein each waypoint of the one or more waypoints comprises coordinates relative to a current location of the robotic vehicle.

In some embodiments of the method, the computer system comprises a map of surroundings of the robotic vehicle, and wherein the map indicates one or more safe areas and one or more unsafe areas within the surroundings.

In some embodiments of the method, the emergency trajectory is configured to cause the robotic vehicle to navigate to a closest safe area in a current direction of travel of the robotic vehicle.

In another broad aspect of the present technology, there is provided a robotic vehicle. The robotic vehicle comprises: a chassis controller, a plurality of sensors, and a computer system comprising at least one processor and a memory storing a plurality of executable instructions which, when executed by the at least one processor, cause the computer system to: receive data measured by the plurality of sensors, wherein the data is representative of surroundings of the robotic vehicle; generate, based on the data, a base trajectory for the robotic vehicle; generate, based on the data, an emergency trajectory for the robotic vehicle; and transmit the base trajectory and the emergency trajectory to the chassis controller, wherein the chassis controller comprises at least one processor and memory storing a plurality of executable instructions which, when executed by the at least one processor of the chassis controller, cause the chassis controller to: cause the robotic vehicle to travel along the base trajectory; and after determining that a communication error has occurred between the computer system and the chassis controller, cause the robotic vehicle to travel along the emergency trajectory.

In some embodiments of the system, the instructions that cause the chassis controller to cause the robotic vehicle to travel along the emergency trajectory comprise instructions that cause the robotic vehicle to travel along the emergency trajectory using a subset of the plurality of sensors.

In some embodiments of the system, the subset of the plurality of sensors comprises at least one accelerometer, at least one odometry sensor, and at least one ultrasonic sensor.

In some embodiments of the system, the emergency trajectory is configured to cause the robotic vehicle to navigate to a closest safe area in a current direction of travel of the robotic vehicle.

In some embodiments of the system, the instructions, when executed by the at least one processor, cause the computer system to generate, at a predetermined interval of time, an updated emergency trajectory.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" may be any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. Some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus, information includes, but is not limited to audio-visual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" may be any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology may each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
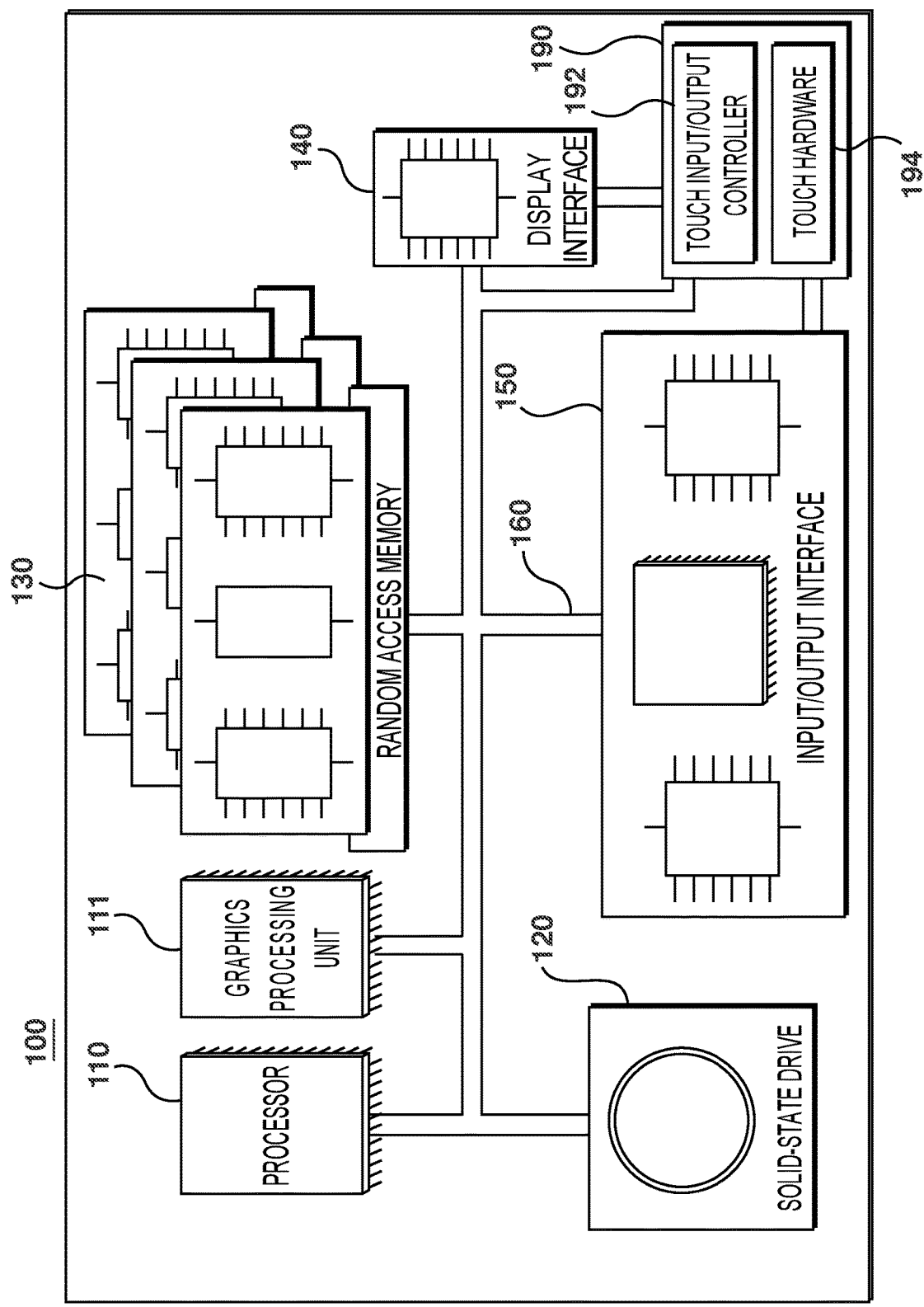
FIG. 1 depicts a schematic diagram of an example computer system for implementing non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology. The computer system 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computer system 100 comprises various hardware components including one or more single or multi-core processors collectively represented by processor 110, a solid-state drive 120, a random-access memory 130, and an input/output interface 150. The computer system 100 may be a computer specifically designed to operate a machine learning algorithm (MLA). The computer system 100 may be a generic computer system. The computer system 100 may be integrated in a robotic vehicle and/or may be configured to control a robotic vehicle.

In some embodiments, the computer system 100 may also be a subsystem of one of the above-listed systems. In some other embodiments, the computer system 100 may be an "off-the-shelf" generic computer system. In some embodiments, the computer system 100 may also be distributed amongst multiple systems. The computer system 100 may also be specifically dedicated to the implementation of the present technology. As a person in the art of the present technology may appreciate, multiple variations as to how the computer system 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid-state drive, hard disk drive, a magnetic disk drive, and/or an optical disk drive.

Communication between the various components of the computer system 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190.

According to some implementations of the present technology, the solid-state drive 120 stores program instructions suitable for being loaded into the random-access memory 130 and executed by the processor 110 for executing acts of one or more methods described herein. For example, at least some of the program instructions may be part of a library or an application.

Figure 2:
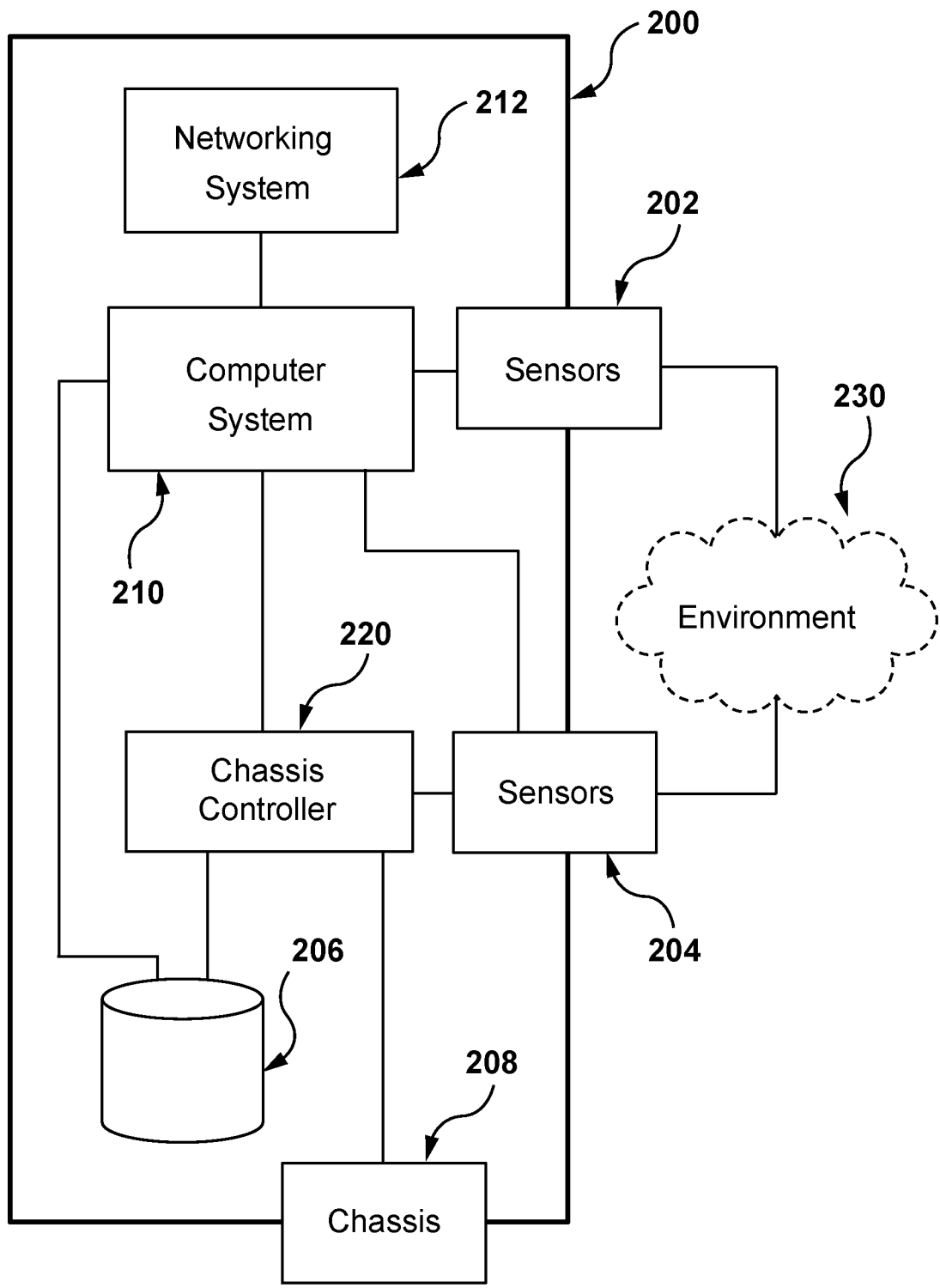
FIG. 2 depicts a diagram of a robotic vehicle according to some embodiments of the present technology.

FIG. 2 depicts a diagram of a robotic vehicle 200 according to some embodiments of the present technology. The robotic vehicle 200 may be a vehicle configured to navigate within an environment 230 for various purposes such as delivering goods, environmental exploration, transporting passengers, etc. The robotic vehicle 200 may be a self-driving vehicle and/or may be controlled, remotely or locally, by a human operator. The robotic vehicle 200 may be a land vehicle comprising a chassis and wheels, an air vehicle such as a drone, and/or a vehicle for traveling across water, snow, sand, and/or any other surface (or combination of surfaces).

The robotic vehicle 200 may comprise a computer system 210. The computer system 210 may be the computer system 100 and/or may include some or all of the components of the computer system 100. The computer system 210 may control various aspects of the robotic vehicle 200, such as by determining a trajectory for the robotic vehicle 200 and/or causing the robotic vehicle 200 to travel along the trajectory. The computer system 210 may store the trajectory and/or any other information in a memory 206. The memory 206 may be any type of storage medium, such as an SSD or flash memory. The computer system 210 may control any aspect of the robotic vehicle 200, such as lights on the robotic vehicle 200, speakers of the robotic vehicle 200, a speed of the robotic vehicle 200, etc.

The environment 230 may include streets, roads, sidewalks, crosswalks, and/or any other exterior areas. The environment 230 may include an office, warehouse, store, home, apartment building, and/or any other interior area.

The robotic vehicle 200 may comprise a chassis 208, which may include and/or be connected to any number of wheels. The chassis 208 may contain some or all of the components illustrated in FIG. 2, such as the computer system 210, chassis controller 220, sensors 202, and/or sensors 204. The chassis 208 may comprise six 3-axis wheels with drives, each drive comprising a stator and a rotor, each stator being defined by a rotation axis and comprising fixed Electromotive Force (EMF) winding. The rotor may include a permanent magnet. The robotic vehicle 200 may be driven by causing the wheels to rotate via applying an electromagnetic field. One or more Hall effect sensors and/or or other types of sensors may provide information regarding the wheels and/or robotic vehicle 200, such as indicating an orientation of the robotic vehicle 200 and/or an angular velocity of each of the wheels. The chassis 208 may comprise any other suitable mechanism for causing the robotic vehicle 200 to travel, such as continuous tracks, skis, a mechanism for traveling on rails, and/or any other suitable mechanism for navigating within the environment 230.

The robotic vehicle 200 may be a leisure and/or transportation vehicle such as a private or commercial car, truck, motorbike or the like. The robotic vehicle 200 may be a user operated vehicle and/or a driver-less vehicle (i.e. an autonomous vehicle).

The robotic vehicle 200 may comprise various sensors, such as a first set of sensors 202 and a second set of sensors 204. The sensors 202 and 204 may include image sensors, charge-coupled device (CCD) sensors, complementary metal oxide semiconductor (CMOS) sensors, digital cameras, light detection and ranging (LiDAR) sensors, radar sensors, time of flight (TOF) 3D cameras, stereo vision sensors comprising two or more cameras, 3D sonar, such as 3D ultrasound sensors, structured-light 3D cameras and/or scanners, and/or any other type of sensors. The sensors 202 and 204 may be communicably connected with the computer system 210 and/or a chassis controller 220. The sensors 202 and 204 may be configured to gather data regarding the environment 230 and/or the robotic vehicle 200. The sensors 202 and 204 may be mounted on an interior, upper portion of a windshield of the robotic vehicle 200, a back window, side windows, front hood, rooftop, front grill, or front bumper of the robotic vehicle 200, and/or anywhere else on the robotic vehicle 200. The sensors 202 and 204 may be mounted in a dedicated enclosure mounted on the top of the robotic vehicle 200.

The spatial placement of the sensors 202 and 204 may be selected based on various factors, such as the environment 230 that the robotic vehicle 200 is intended to be used in, the tasks that the robotic vehicle 200 is configured to perform, weather conditions of the environment 230 where the robotic vehicle 200 is to be used (such as frequent rain, snow, and other elements), and/or other factors related to the robotic vehicle 200.

The sensors 202 and 204 may include one or more cameras configured to capture images and/or video of the environment 230. The cameras may be configured to capture a portion of the environment 230 surrounding the robotic vehicle 200, such as a 90-degree view or a 180-degree view of the environment 230 in the direction of travel of the robotic vehicle 200. The sensors 202 and 204 may comprise one or more light detection and ranging (LiDAR) sensors and/or one or more radio detection and ranging (radar) sensors. The radar sensors may comprise long-range, medium-range, and/or short-range radar sensors. The sensors 202 and 204 may be used for adaptive cruise control, automatic emergency braking, and forward collision warning, park assist, cross-traffic alert, junction assist, blind side detection, and/or other functions of the robotic vehicle 200. The sensors 202 and 204 may comprise CCD/CMOS sensors and/or other sensors.

The sensors 202 and 204 may comprises ultrasonic SONAR sensors, odometry sensors including accelerometers and gyroscopes, mechanical tilt sensors, and/or a magnetic compass. For example, the sensors 204 may comprise at least one accelerometer, at least one odometry sensor, and at least one ultrasonic sensor while the sensors 202 may comprise a LiDAR sensor, a radar sensor, and a camera.

The chassis controller 220 may be communicably connected to the computer system 210. The chassis controller 220 may receive a trajectory and/or other commands from the computer system 210. The chassis controller 220 may control the chassis 208 based on the commands from the computer system 210. For example, the chassis controller 220 may receive a trajectory from the computer system 210 and control the chassis 208 to cause the robotic vehicle 200 to navigate within the environment 230 according to the trajectory. The chassis controller 220 may be communicably connected to the memory 206 and may access information stored on the memory 206. The chassis controller 220 may be a computer system, such as the computer system 100. The chassis controller 220 may be a computer system with a lower failure rate than the computer system 210, i.e., the chassis controller 220 may be more reliable and/or less likely to experience a malfunction than the computer system 210.

A map of the environment 230 may be stored in the memory 206 and/or accessed by the computer system 210 and/or the chassis controller 220. The map may be used by the computer system 210 to determine a current location of the robotic vehicle 200 in the environment 230. The robotic vehicle 200 may include a global positioning system (GPS) sensor and/or other positioning technologies for determining a location of the robotic vehicle 200 in the environment 230 using the map.

The robotic vehicle 200 may comprise a networking system 212. The networking system 212 may be used by the computer system 210 and/or chassis controller 220 to communicate with one or more remote servers and/or other devices. The networking system 212 may communicate a Local Area Network (LAN), a wireless connection such as a Wireless Local Area Network (WLAN), and/or any other type of network. The networking system 212 may communicate via Wi-Fi, cellular network, and/or any other type of network. The computer system 210 and/or chassis controller 220 may download maps, instructions, indication of a destination, and/or any other information using the networking system 212. The networking system 212 may be used to upload a current position of the robotic vehicle 200, speed of the robotic vehicle 200, generated trajectories of the robotic vehicle, data measured by the sensors 202 and/or 204, and/or any other information regarding the robotic vehicle 200. The data may be uploaded to a server managing the robotic vehicle 200.

The map of the environment 230 may comprise a representation of a segmentation of the environment 230 into one or more areas. The map may indicate a degree of safety for the one or more areas. The degree of safety of an area may indicate whether the robotic vehicle 200 is permitted to stop in the area. For example, the map may indicate that a roadway is an unsafe area for the robotic vehicle 200 to stop. The map may include multiple layers, where each layer provides a different type of data. For example, a first layer of the map may include safe areas for the robotic vehicle 200 to stop, and a second layer of the map may include unsafe areas for the robotic vehicle 200 to stop. In another example, a first layer of the map may include roadways, a second layer of the map may include sidewalks, and a third layer of the map may include structures. The different layers of the map may provide a different resolution and/or level of detail. The map may be divided into various segments. When the robotic vehicle 200 approaches an area and/or enters an area, the segment of the map corresponding to that area may be retrieved by the robotic vehicle 200. For example, the robotic vehicle 200 may retrieve the segment from a remote server. The map may include various attributes. Each attribute may be associated with a location or area on the map. The robotic vehicle 200 may use positioning technology, such as GPS, in combination with the map to determine a degree of safety associated with its current location.

The computer system 210 may generate a base trajectory and/or an emergency trajectory. The base trajectory and/or emergency trajectory may be determined based on data captured by the sensors 202 and 204. The base trajectory and/or the emergency trajectory may define a path to be travelled by the robotic vehicle 200 to reach a destination. The base trajectory and/or emergency trajectory may be in the format of a series of coordinates, a direction, a curve, a speed, a series of instructions, and/or any other suitable format for a trajectory. In accordance with some non-limiting embodiments of the present technology, the computer system 210 generates both the base trajectory and the emergency trajectory.

The base trajectory and the emergency trajectory may be stored in the memory 206 and/or transmitted to the chassis controller 220. The computer system 210 may generate instructions for the chassis controller 220 based on the base trajectory.

During normal operating conditions when the robotic vehicle 200 appears to be operating normally, the robotic vehicle 200 may be commanded to follow the base trajectory. If a determination is made that the robotic vehicle 200 is operating under abnormal operation conditions, the robotic vehicle 200 may switch to an emergency mode and might no longer travel according to the base trajectory. Instead, the chassis controller 220 may execute the emergency trajectory, thereby causing the robotic vehicle 200 to travel along the emergency trajectory.

The computer system 210 may use data from both the sensors 202 and 204 during normal operations to operate the robotic vehicle 200. During a malfunction, the chassis controller 220 may control operations of the robotic vehicle 200. The chassis controller 220 may use a subset of the sensors 202 and 204 for controlling the robotic vehicle. For example, the chassis controller 220 may use the sensors 204 and might not use the sensors 202. The chassis controller 220 may use one or more accelerometers, one or more odometry sensors, one or more ultrasonic sensors, or any combination of those sensors to travel along the emergency trajectory.

Figure 3:
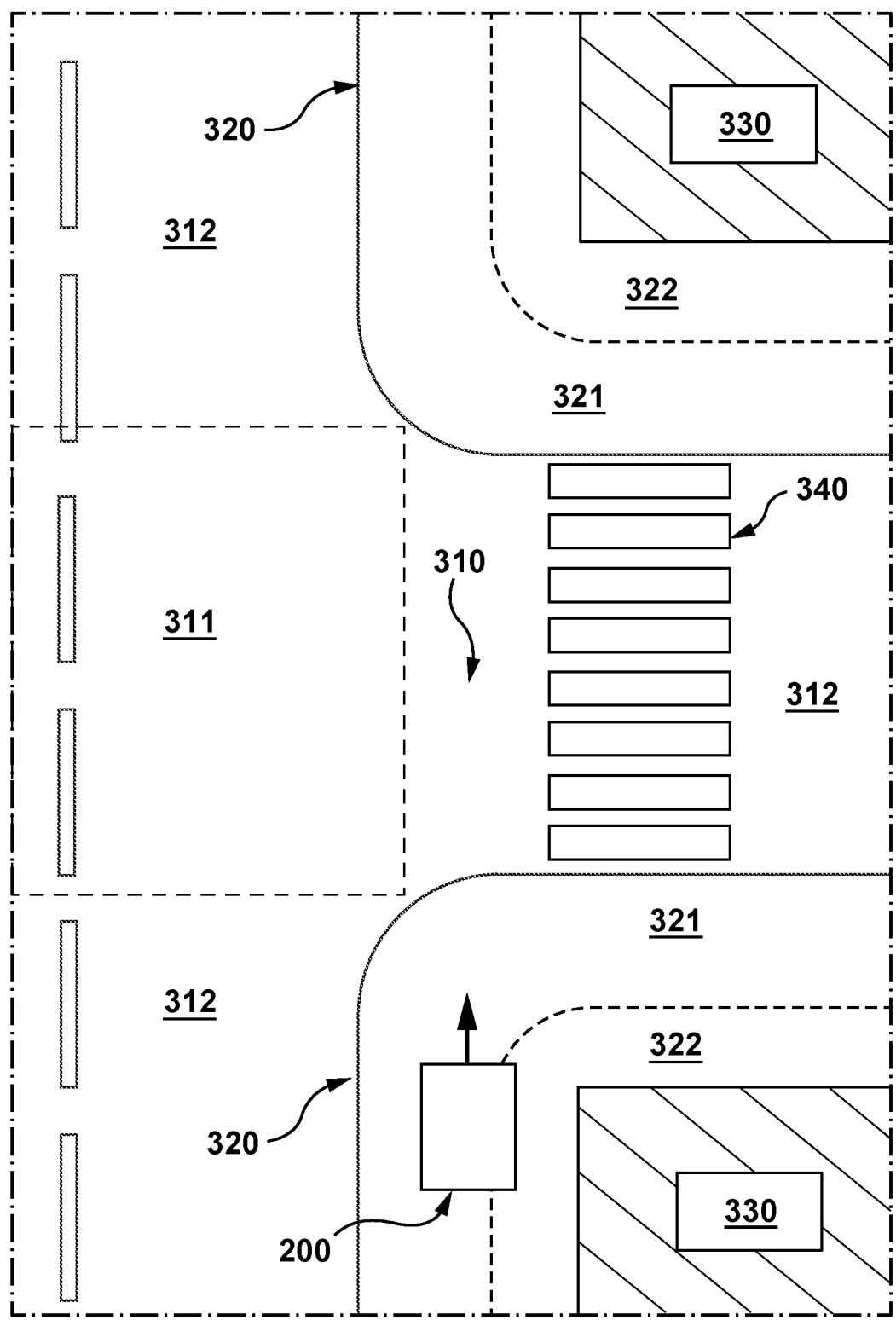
FIG. 3 depicts a robotic vehicle at a street intersection according to some embodiments of the present technology.

FIG. 3 depicts the robotic vehicle 200 at a street intersection according to some embodiments of the present technology. An arrow illustrated on the robotic vehicle 200 indicates a current direction of travel of the robotic vehicle 200. The street intersection comprises a road area 310 comprising a road intersection sub-area 311, a crosswalk area 340, and road portion sub-areas 312. The street intersection comprises sidewalk areas 320 comprising central sidewalk sub-areas 321, building-side sidewalk sub-areas 322, and buildings 330.

The robotic vehicle 200 may travel through the road area 310 and/or the sidewalk areas 320. The buildings 330 may be inaccessible to the robotic vehicle 200, such as because the robotic vehicle 200 might not be able to enter the buildings 330 (for example if the buildings have closed doors). A map of the intersection illustrated in FIG. 3 may be stored in a memory of the robotic vehicle 200, for instance in the memory 206. The map may indicate a degree of safety for various areas in the map.

Each of the areas and sub-areas 310, 311, 312, 320, 321, 322, 330, and/or 340 may be associated with an indication of safety. The indication of safety may be used to determine where the robotic vehicle 200 will be instructed to stop if a malfunction occurs. The indication of safety may be a binary indicator indicating that an area is either safe or unsafe for the robotic vehicle 200 to stop in. The indication of safety may have any number of degrees of safety, for example the degree of safety of the road intersection sub-area 311 may be '0', the degree of safety of the road portion sub-areas 312 may be '1', the degree of safety of the crosswalk area 340 may be '2', the degree of safety of the central sidewalk sub-areas 321 may be '3', and the degree of safety of the building-side sidewalk sub-areas 322 '4'. In this example, '0' is the lowest degree of safety, i.e. the least safe location for the vehicle 200 to stop, and '4' is the highest degree of safety, i.e. the safest location for the vehicle 200 to stop.

The sidewalk areas 320 may be defined as safe areas for the robotic vehicle 200 to stop in an emergency as the robotic vehicle 200 is unlikely to collide with another vehicle while on the sidewalk areas 320. Further, the sidewalk sub-areas 322 may be defined as safer locations to stop than the sidewalk sub-areas 321. Because the sidewalk sub-areas 322 are at the edges of the building 330, if the robotic vehicle 200 stops in the sidewalk sub-areas 322 the robotic vehicle 200 may be less likely to interfere with pedestrians than if the robotic vehicle 200 stops in the sidewalk sub-areas 321.

The road area 310 may be defined as an unsafe area for the robotic vehicle 200 to stop in an emergency as the robotic vehicle 200 may be more likely to collide with another vehicle when stopped in the road area 310. The road intersection sub-area 311 may be defined as less safe than the road portion sub-areas 312, because the road intersection sub-area 311 will include traffic from multiple roadways. Intersections between multiple roads, such as the road intersection sub-area 311, may be considered particularly unsafe for the robotic vehicle 200 to stop in.

Figure 4:
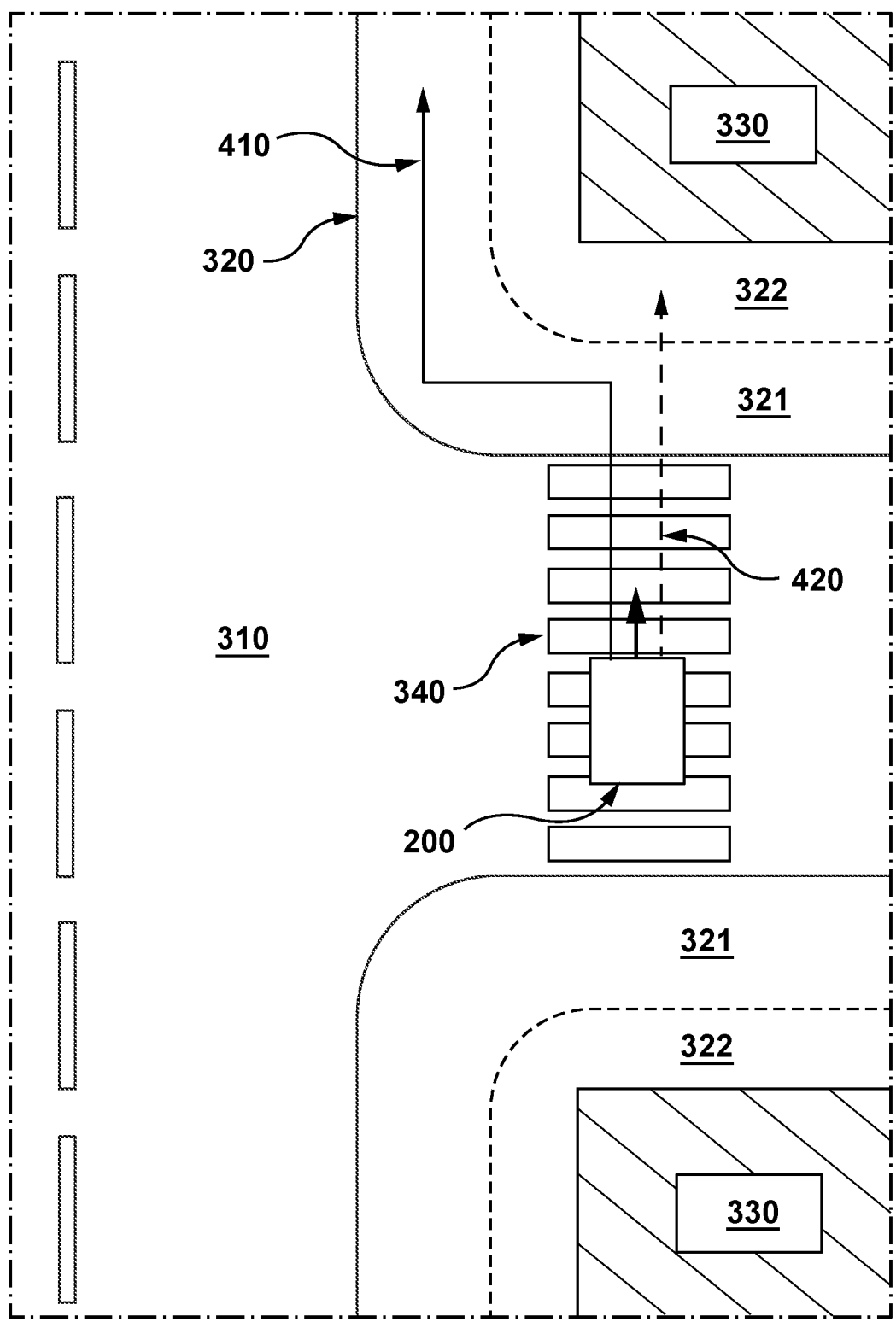
FIG. 4 depicts a robotic vehicle located on a crosswalk according to some embodiments of the present technology.

FIG. 4 depicts the robotic vehicle 200 located on a crosswalk in accordance with at least some embodiments of the present technology. A base trajectory 410 and an emergency trajectory 420 for the robotic vehicle 200 are illustrated in FIG. 4. In FIG. 4, the robotic vehicle 200 is currently traveling on the crosswalk sub-area 340, which may be identified as an unsafe area for the robotic vehicle 200 to stop. For example, a map used by the robotic vehicle 200 may indicate that the crosswalk sub-area 340 is an unsafe area for the robotic vehicle 200 to stop. In another example, the robotic vehicle 200 may determine that it is currently traveling on a roadway, and based on pre-defined rules indicating that a roadway is an unsafe area to stop the robotic vehicle 200 may determine that the crosswalk sub-area 340 is an unsafe area to stop.

Under normal operation conditions, the robotic vehicle 200 may travel along the base trajectory 410 causing the robotic vehicle 200 to travel on the central sidewalk sub-area 321. If a malfunction were to occur, the robotic vehicle 200 may switch to traveling along the emergency trajectory 420. The emergency trajectory 420 may cause the robotic vehicle to reach the building-side sidewalk sub-area 322, where the robotic vehicle 200 may then stop until the malfunction is resolved. The emergency trajectory may comprise one or more segments, each segment defining a path between two areas having distinct degrees of safety, a degree of safety of the destination being the highest of the two distinct degrees of safety.

Figure 5:
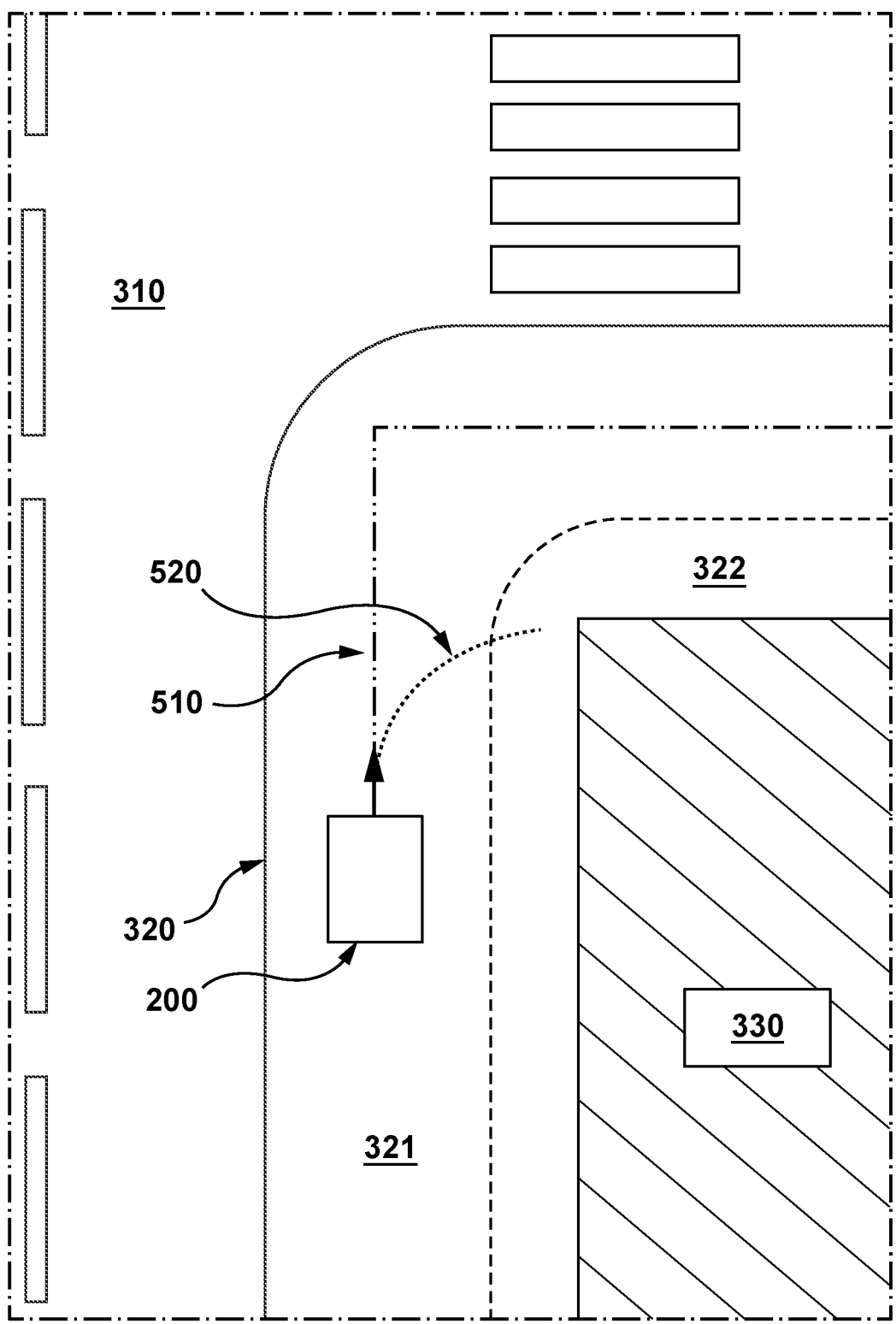
FIG. 5 depicts a robotic vehicle located on a sidewalk according to some embodiments of the present technology.

FIG. 5 depicts the robotic vehicle 200 located on a sidewalk according to some embodiments of the present technology. For convenience of travelling and/or safety of the robotic vehicle 200, the robotic vehicle 200 may travel along the central sidewalk sub-area 321 of the sidewalk area 320. As discussed above, the central sidewalk sub-area 321 may be associated with a lower degree of safety than a degree of safety associated with the building-side sidewalk sub-area 322.

A base trajectory 510 causes the robotic vehicle 200 to continue traveling on the central sidewalk sub-area 321 under normal operating conditions. At a current location of the robotic vehicle 200, the emergency trajectory 520 may be defined to cause the robotic vehicle 200 to navigate to the building-side sidewalk sub-area 322 if a failure is detected and the robotic vehicle 200 enters the emergency mode. As discussed above the degree of safety associated with the building-side sidewalk sub-area 322 may be higher than the degree of safety of the central sidewalk sub-area 321.

Method for Controlling Movement of a Robotic Vehicle (Non-Limiting Embodiment)

Figure 6:
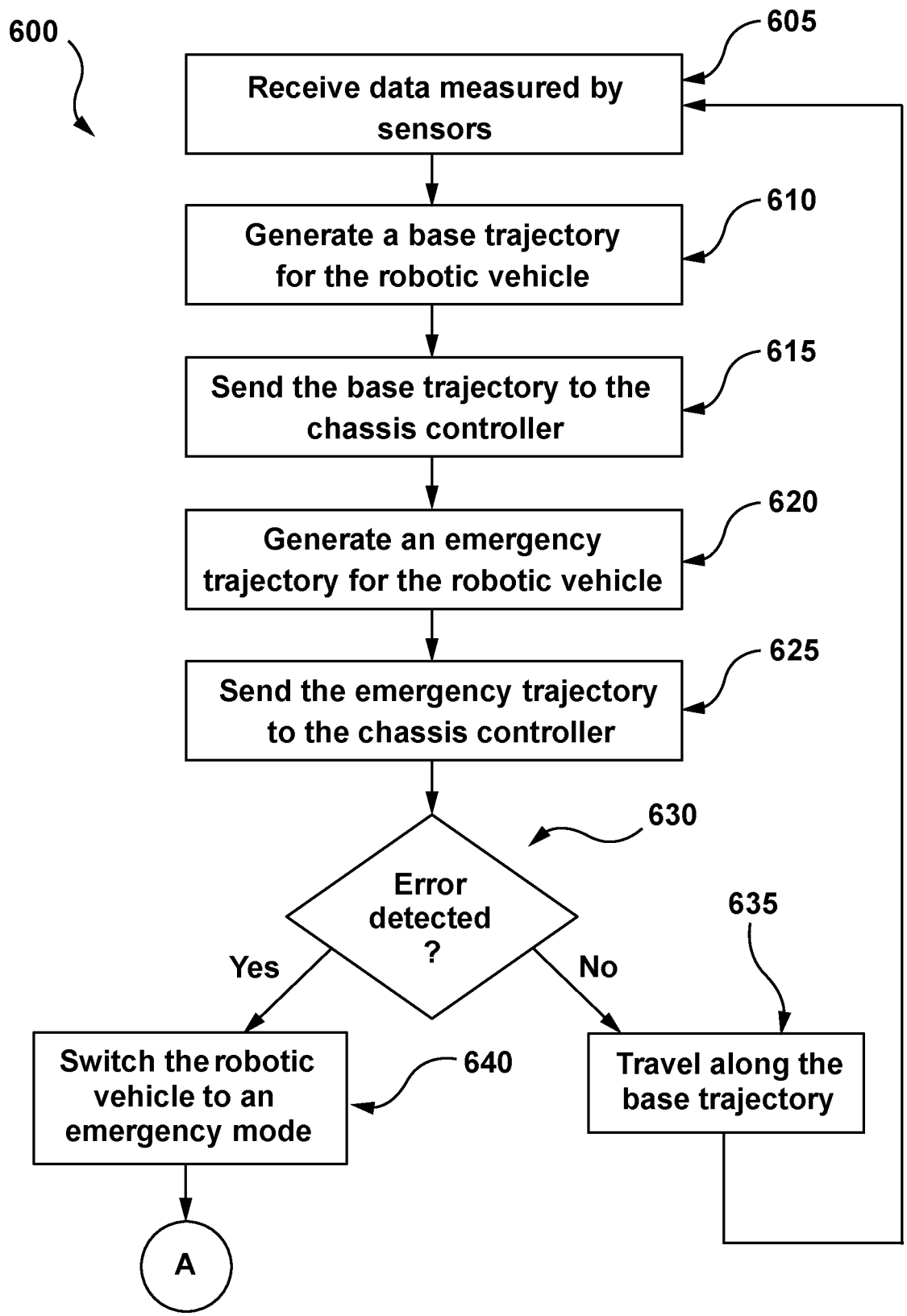
FIGS. 6 and 7 are a flow diagram of a method for controlling movement of a robotic vehicle according to some embodiments of the present technology.
Figure 7:
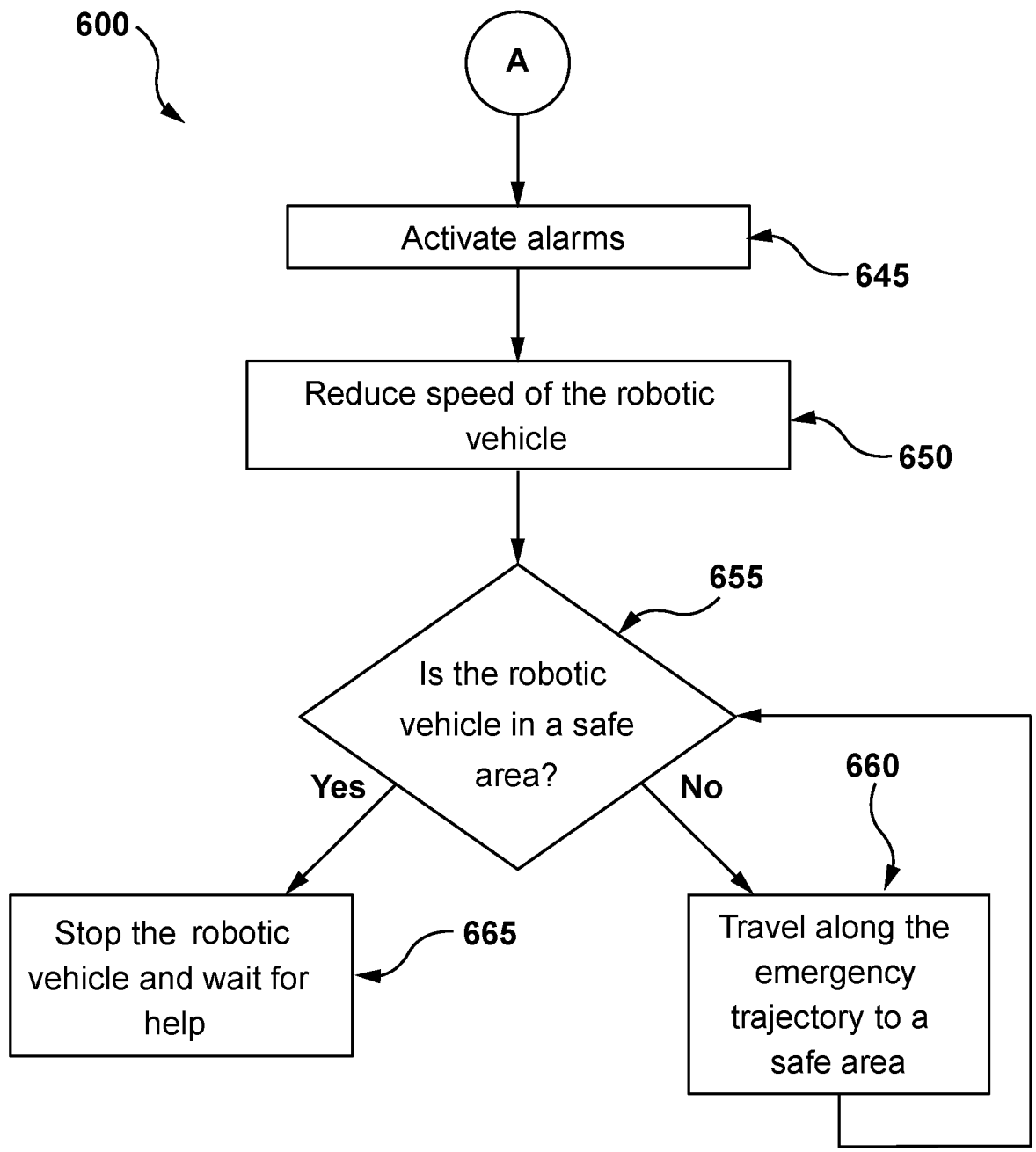

FIGS. 6 and 7 are flow diagrams of a method 600 for controlling movement of a robotic vehicle, such as the robotic vehicle 200, according to some embodiments of the present technology. In one or more aspects, the method 600 or one or more steps thereof may be performed by a computer system, such as the computer system 210 and/or chassis controller 220. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 605: Receive Data

At step 605, data acquired by sensors may be received. The computer system 210 of the robotic vehicle 200 may receive data measured by the sensors 202 and/or the sensors 204. The received data may be in the format of a video stream, images, signals, and/or any other type of data. The received data may indicate events, objects, or any entities in the environment surrounding the robotic vehicle 200. The computer system 210 may be configured to process the received data, for example by executing signal processing routines and/or computer vision routines to generate a representation of surroundings of the robotic vehicle 200.

Step 610: Generate a Base Trajectory

At step 610, a base trajectory may be generated for the robotic vehicle 200. The base trajectory may be generated by the computer system 210. The base trajectory may define a path between a current position of the robotic vehicle 200 and a predetermined destination. The base trajectory may be in the format of a series of coordinates, a direction, a curve, a speed, a series of instructions, and/or any other suitable format for a trajectory. The base trajectory may be in a format suitable for use by the chassis controller 220 to cause the robotic vehicle 200 to travel along the base trajectory.

The base trajectory may be determined based on the data received from the sensors and/or a map, such as a map stored in the memory 206. The base trajectory may be updated as new data is received, such as additional data from the sensors, at a predetermined frequency, and/or at any other interval.

The map may be accessed by the computer system 210 to determine the base trajectory. A current position of the robotic vehicle 200 may be determined using the received sensor data and/or using a positioning system, such as a global positioning system (GPS) sensor and/or other positioning technologies.

The predetermined destination may comprise coordinates and/or any other indication of a location. The predetermined destination may have been received by the robotic vehicle 200, such as from a server managing the robotic vehicle 200.

Step 615: Send the Base Trajectory to the Chassis Controller

At step 615, the base trajectory may be sent to the chassis controller. For example the computer system 210 may send the base trajectory to the chassis controller 220. The computer system 210 may store the base trajectory in the memory 206, where the chassis controller 220 may retrieve the base trajectory. All or a portion of the base trajectory may be sent to the chassis controller 220. The base trajectory may be sent to the chassis controller 220 in a format suitable for execution by the chassis controller 220. Although described as being sent to the chassis controller 220, it should be understood that the base trajectory may be sent to any other system or systems operating the robotic vehicle 200, and/or may be used by the computer system 210 to operate the robotic vehicle 200.

Step 620: Generate an Emergency Trajectory

At step 620, an emergency trajectory may be generated. The computer system 210 may generate an emergency trajectory to be travelled along by the robotic vehicle 200 after the robotic vehicle 200 enters an emergency mode. The emergency trajectory may define an emergency path between a current position of the robotic vehicle 200 and an area of the environment where it is considered safe for the robotic vehicle 200 to stop.

As described above, the map used by the robotic vehicle 200 may include indications of a degree of safety of various areas on the map. The degree of safety of an area may be determined based on the map and/or based on sensor data. For instance, if a determination is made by the computer system 210 that an area within range the sensors is not a road and is less crowded than a current position of the robotic vehicle 200, the computer system 210 may determine that this area would be a safe area for stopping the robotic vehicle 200.

The emergency trajectory may include one or more waypoints to be followed by the robotic vehicle 200 to reach a safe destination for stopping (i.e. an emergency destination), the waypoints thereby defining the emergency path. Each waypoint may comprise coordinates relative to a current location of the robotic vehicle 200. The emergency trajectory may be in the format of a series of coordinates, a direction, a curve, a speed, a series of instructions, and/or any other suitable format for a trajectory that may be used by the chassis controller 220 to cause the robotic vehicle 200 to reach the emergency destination.

The computer system 210 may define the emergency destination as a closest area having a higher degree of safety than a current position of the robotic vehicle 200, said area being located in a vicinity of the robotic vehicle 200. The emergency destination may be determined based on a current direction of travel of the robotic vehicle 200, and may be selected to be in the current direction of travel of the robotic vehicle 200.

The emergency destination may be the current location of the robotic vehicle 200 if a determination is made that the robotic vehicle 200 is currently located in a safe area for stopping, such as an area indicated to be safe, an area having a safety rating above a predetermined threshold rating, and/or an area having a highest safety rating of areas within a predetermined distance of the robotic vehicle 200.

The emergency trajectory may be generated simultaneously with the base trajectory at step 610. For example, each time an updated base trajectory is generated, an updated emergency trajectory may also be generated. The emergency trajectory may be updated at a predetermined interval, such as every two seconds a new emergency trajectory may be generated. In some embodiments of the present technology, the emergency trajectory may be updated less frequently than the base trajectory. In some alternative embodiments, the frequency of the updating the emergency trajectory may depend on the then current environment 230. For example, the emergency trajectory may be updated less frequently when the then current environment 230 comprises the crosswalk area 340 and more frequently when the then current environment 230 comprises the road intersection sub-area 311.

More specifically, the predetermined interval may be adjusted based on a current location of the robotic vehicle 200. The computer system 210 may determine a degree of safety of the current location of the robotic vehicle 200. For example, the computer system 210 may determine a current location of the robotic vehicle 200 using GPS and then use the map to determine a degree of safety associated with the current location of the robotic vehicle 200. The predetermined interval may be adjusted based on the degree of safety associated with the current location. The emergency trajectory may be updated more frequently when the robotic vehicle 200 is in an unsafe location. For example, the emergency trajectory may be updated every five seconds when the robotic vehicle 200 is on a sidewalk, and every one second when the robotic vehicle 200 is in a roadway.

It may be more efficient and/or less power-consuming for the robotic vehicle 200 to reduce the rate at which the emergency trajectory is updated. To reduce power consumption and/or other resources, the emergency trajectory may be updated less frequently when the robotic vehicle 200 is in an area that is considered to be safe.

Step 625: Send the Emergency Trajectory to the Chassis Controller

At step 625, the emergency trajectory may be sent to the chassis controller. The computer system 210 may send the emergency trajectory to the chassis controller 220. Actions performed at step 625 may be similar to those described above with regard to step 615.

Step 630: Determination of an Occurrence of an Error

At step 630, a determination is made whether an error has occurred. The determination may be made by the computer system 210 and/or chassis controller 220. The determination may be made by assessing a state of communications between the computer system 210 and the chassis controller 220. An error may be detected based on receiving a predetermined volume of corrupted data packets from the computer system 210, loss of communication with the computer system 20 for a predetermined amount of time, loss of data packets, and/or any other indication of error. The error may be detected based on an indication from a sensor, detecting that a sensor has failed, detecting that the robotic vehicle 200 has deviated from the base trajectory, based on conflicting sensor data, and/or any other indication that an error has occurred. It should be understood that any suitable method for detecting a malfunction of the robotic vehicle 200 may be used.

Step 635: Travel Along the Base Trajectory

If no error has been detected at step 630, the robotic vehicle may operate under normal operation conditions at step 635 and travel along the base trajectory. The chassis controller 220 may access and execute the instructions corresponding to the base trajectory, thereby causing the robotic vehicle 200 to travel along the base trajectory. While traveling along the base trajectory, the computer system 210 may update the base trajectory in real-time or at a predetermined frequency based on data captured by the sensors 202 and/or 204. The computer system 210 may use data captured by the sensors 202 and/or 204 to follow the path defined by the base trajectory.

Step 640: Switch the Robotic Vehicle to Emergency Mode

If, at step 630, an error is detected, the robotic vehicle may switch to an emergency mode at step 640. In the emergency mode, the chassis controller 220 may disable communication with the computer system 210. The chassis controller 220 may retrieve a latest update of the emergency trajectory transmitted by the computer system 210 and/or stored in the memory 206. The method 600 may continue from step 640 to step 645.

Step 645: Activate Alarms

At step 645, various alarms may be activated to signal that the robotic vehicle is in the emergency mode. The robotic vehicle 200 may activate a signal sound and/or lights when in the emergency mode. The sounds and/or lights may remain activated until the robotic vehicle 200 arrives at the emergency destination and stops moving and/or until the emergency mode is deactivated. The emergency mode may be manually and/or remotely deactivated by an operator, for instance if the operator determines that the robotic vehicle 200 may continue operating under normal operating conditions.

Step 650: Reduce Speed of the Robotic Vehicle

At step 650, the speed of the robotic vehicle may be reduced. The speed of the robotic vehicle 200 may be reduced and/or maintained below a predetermined maximum speed until the emergency mode is deactivated.

Step 655: Is the Robotic Vehicle in a Safe Area?

At step 655, determination may be made as to whether the robotic vehicle is in a safe area. If the robotic vehicle 200 is not in a safe area, the robotic vehicle 200 may travel along the emergency trajectory to a safe area and then stop. Otherwise, if the robotic vehicle 200 is already in a safe area when the malfunction occurs, the robotic vehicle 200 may stop in its current location.

The computer system 210 and/or chassis controller 220 may determine whether the robotic vehicle 200 is in a safe area for stopping. The current location of the robotic vehicle 200 may be determined and compared to a map indicating safe and unsafe areas for stopping the robotic vehicle 200. The determination may be made based on the emergency trajectory. The emergency trajectory may indicate that the robotic vehicle 200 is in a safe location and can stop.

Step 660: Travel Along the Emergency Trajectory

If the robotic vehicle is determined not to be in a safe location, at step 660 the robotic vehicle may travel along the emergency trajectory to a safe area. The chassis controller 220 may access and execute instructions corresponding to the emergency trajectory to cause the robotic vehicle 200 to travel along the emergency trajectory. The chassis controller 220 may rely on a subset of the sensors 202 and 204 to cause the robotic vehicle 200 to travel along the emergency trajectory. For example the chassis controller 220 may use the sensors 204 and might not use the sensors 202 to cause the robotic vehicle to travel along the emergency trajectory. The sensors 204 used by the chassis controller 220 may comprise at least one accelerometer, at least one odometry sensor, and/or at least one ultrasonic sensor. The sensors 204 used by the chassis controller 220 may comprise an accelerometer and an odometry sensor, and might not include an ultrasonic sensor.

The chassis controller 220 may adjust and/or update the emergency trajectory based on data captured by the sensors 204. For example, if the data captured by sensors 204 indicates that the emergency trajectory is obstructed by an obstacle, the chassis controller 220 may update the emergency trajectory to avoid the obstacle. When updating the emergency trajectory, the chassis controller 220 may use the map of the environment to determine the updated emergency trajectory. For instance, the chassis controller 220 may use the map to define an updated emergency trajectory that causes the robotic vehicle 200 to travel through areas having higher indicated degrees of safety and/or near said areas to reach the emergency destination.

If a malfunction is detected while the robotic vehicle 200 is traveling along the emergency trajectory, the robotic vehicle 200 may be instructed to stop immediately. If the chassis controller 220 is malfunctioning and/or if the robotic vehicle 200 is deviating from the emergency trajectory the robotic vehicle 200 may be stopped immediately, regardless of the safety of the current location of the robotic vehicle 200.

Step 665: Stop the Robotic Vehicle

After determining that the robotic vehicle is in a safe area, at step 665, the robotic vehicle may stop. The robotic vehicle 200 may stop in the safe area and wait until further instructions are received from a remote operator and/or a technician arrives to retrieve the robotic vehicle 200. The robotic vehicle 200 may maintain the signal sound and/or lights until the emergency mode is deactivated. The robotic vehicle 200 may send an indication of a location of the robotic vehicle 200 and/or any other information regarding the robotic vehicle 200 or the malfunction to a remote server. An operator may access the information to determine whether to dispatch a technician to the location of the robotic vehicle 200.

Method for Controlling Movement of a Robotic Vehicle Using a Map (Non-Limiting Embodiment)

Figure 8:
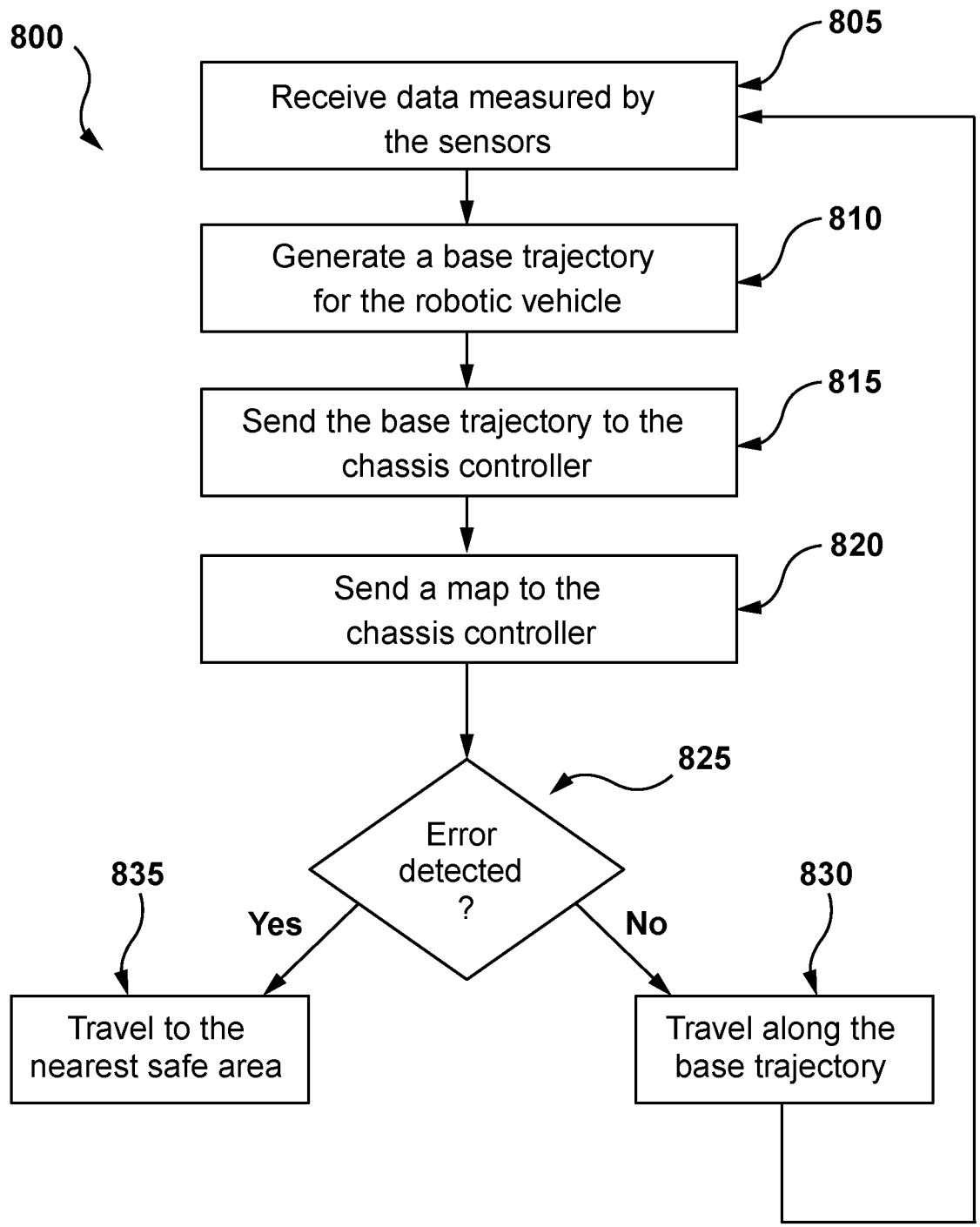
FIG. 8 is a flow diagram of a method for controlling movement of a robotic vehicle using a map according to some embodiments of the present technology.

FIG. 8 is a flow diagram of a method 800 for controlling movement of a robotic vehicle according to some embodiments of the present technology. In one or more aspects, the method 800 or one or more steps thereof may be performed by a computer system, such as the computer system 210 and/or chassis controller 220. The method 800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 805: Receive Data Captured by the Sensors

At step 805, data may be received from sensors. The computer system 210 may receive data from the sensors 202 and/or 204. Actions performed at step 805 may be similar to those described above with regard to step 605.

Step 810: Generate a Base Trajectory

At step 810, a base trajectory may be generated for the robotic vehicle. The computer system 210 may generate the base trajectory for the robotic vehicle 200 based on data from the sensors 202 and 204. Actions performed at step 810 may be similar to those described above with regard to step 610.

Step 815: Send the Base Trajectory to the Chassis Controller

At step 815, the base trajectory may be sent to the chassis controller. The computer system 210 may store the base trajectory in the memory 206 and/or send the base trajectory to the chassis controller 220. Actions performed at step 815 may be similar to those described above with regard to step 615.

Step 820: Send a Map to the Chassis Controller

At step 820, a map may be sent to the chassis controller. The computer system 210 may store the map in the memory 206 and/or send the map to the chassis controller 220. The map may include an area surrounding the current location of the robotic vehicle 200. The map may indicate safe areas and/or unsafe areas around the robotic vehicle 200. The map may indicate degrees of safety for areas around the robotic vehicle 200.

The map may be used by the chassis controller 220 when the robotic vehicle 200 malfunctions and enters the emergency mode. Rather than receiving an emergency trajectory, the chassis controller 220 may use the map to determine an emergency trajectory for the robotic vehicle 200. The chassis controller 220 may use the map to pilot the robotic vehicle 200 to a safe area for stopping.

Step 825: Determination of an Occurrence of an Error

At step 825, a determination may be made that an error has occurred. A malfunction of the robotic vehicle 200 may be detected by the computer system 210 and/or chassis controller 220. Actions performed at step 825 may be similar to those described above with regard to step 630.

Step 830: Travel Along the Base Trajectory

If no malfunction was detected at step 825, the robotic vehicle may travel along the base trajectory at step 830. The computer system 210 and/or chassis controller 220 may cause the robotic vehicle 200 to travel along the base trajectory. Actions performed at step 830 may be similar to those described above with regard to step 635.

Step 835: Travel to the Nearest Safe Area

If a malfunction was detected at step 825, the robotic vehicle may switch to an emergency mode and travel to a safe area at step 835. The chassis controller 220 may use the map to cause the robotic vehicle 200 to travel to a nearest safe area. The chassis controller 220 may access the map and select the nearest area having a sufficient degree of safety for stopping the robotic vehicle 200. The nearest safe area may be selected in a current direction of travel of the robotic vehicle 200. For example, in the situation illustrated in FIG. 5, the chassis controller 220 may use the map to determine that the building-side sidewalk sub-area 322 is a safe area located in the direction of travel of the robotic vehicle 200, and the chassis controller 220 may cause the robotic vehicle 200 to travel to the building-side sidewalk sub-area 322.

As described above with regard to step 660, the chassis controller 220 may rely on a subset of the sensors 202 and 204 to cause the robotic vehicle 200 to travel to the nearest safe area. For example the chassis controller may use the sensors 204 and might not use the sensors 202. The subsets of sensors used by the chassis controller 220 may comprise at least one accelerometer, at least one odometry sensor, and/or at least one ultrasonic sensor. The chassis controller 220 may cause the robotic vehicle 200 to stop upon reaching a safe area.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for controlling movement of a robotic vehicle, wherein the robotic vehicle comprises a computer system, a chassis controller that is separate from the computer system and has a lower failure rate than the computer system, and a plurality of sensors, the method comprising:
   receiving, by the computer system, data measured by the plurality of sensors, wherein the data is representative of surroundings of the robotic vehicle;
   generating, by the computer system and based on the data, a base trajectory for the robotic vehicle;
   generating, by the computer system and based on the data, an emergency trajectory for the robotic vehicle;
   transmitting, by the computer system, the base trajectory and the emergency trajectory to the chassis controller;
   repeatedly updating, by the computer system at an interval of time, the emergency trajectory for the robotic vehicle, wherein the interval of time between updating the emergency trajectory is adjusted based on a location of the robotic vehicle, and wherein the interval of time is decreased when the robotic vehicle enters a roadway;
   transmitting, by the computer system and to the chassis controller, the emergency trajectory each time the emergency trajectory is updated;
   determining, by the chassis controller, whether any communication error has occurred between the computer system and the chassis controller;
   selecting, by the chassis controller, the base trajectory or the emergency trajectory, wherein the base trajectory is selected when no communication error has occurred between the chassis controller and the computer system, and wherein the emergency trajectory is selected after determining that a communication error has occurred between the computer system and the chassis controller; and
   executing, by the chassis controller, the selected trajectory thereby causing the robotic vehicle to travel along the selected trajectory.

2. The method of claim 1, wherein determining that the communication error has occurred comprises determining that:
   the chassis controller has not received data packets from the computer system for longer than a predetermined threshold time period, or
   the chassis controller has received a predetermined volume of corrupted data packets from the computer system.

3. The method of claim 1, further comprising, after determining that the communication error has occurred, reducing, by the chassis controller, a speed of the robotic vehicle.

4. The method of claim 3, wherein reducing the speed of the robotic vehicle comprises maintaining, by the chassis controller, the robotic vehicle below a predetermined maximum speed.

5. The method of claim 1, wherein causing the robotic vehicle to travel along the emergency trajectory comprises causing the robotic vehicle to travel based on a subset of the plurality of sensors.

6. The method of claim 5, wherein the subset of the plurality of sensors comprises at least one accelerometer, at least one odometry sensor, and at least one ultrasonic sensor.

7. The method of claim 1, wherein the plurality of sensors comprises a LiDAR sensor, a radar sensor, and a camera.

8. The method of claim 1, wherein generating the emergency trajectory comprises:

determining that the robotic vehicle is in an intersection; and determining a path that exits the intersection, wherein the emergency trajectory comprises the path.

9. The method of claim 1, wherein the emergency trajectory comprises one or more waypoints to be followed by the robotic vehicle, and wherein each waypoint of the one or more waypoints comprises coordinates relative to a current location of the robotic vehicle.

10. The method of claim 1, wherein the computer system comprises a map of surroundings of the robotic vehicle, and wherein the map indicates one or more safe areas and one or more unsafe areas within the surroundings.

11. The method of claim 10, wherein the emergency trajectory is configured to cause the robotic vehicle to navigate to a closest safe area in a current direction of travel of the robotic vehicle.

12. The method of claim 1, wherein the interval of time is increased when the robotic vehicle enters a sidewalk.

13. The method of claim 12, wherein increasing the interval of time reduces a power consumption of the robotic vehicle.

14. The method of claim 1, further comprising:

determining a degree of safety associated with a current location of the robotic vehicle; and adjusting the interval of time based on the degree of safety, wherein the interval of time is higher for locations with a higher degree of safety.

15. A robotic vehicle comprising:

a chassis controller, a plurality of sensors, and a computer system comprising at least one first processor and a first memory storing a plurality of executable instructions which, when executed by the at least one first processor, cause the computer system to:

receive data measured by the plurality of sensors, wherein the data is representative of surroundings of the robotic vehicle;

generate, based on the data, a base trajectory for the robotic vehicle;

generate, based on the data, an emergency trajectory for the robotic vehicle;

transmit the base trajectory and the emergency trajectory to the chassis controller;

repeatedly update, at an interval of time, the emergency trajectory for the robotic vehicle, wherein the interval of time between updating the emergency trajectory is adjusted based on a location of the robotic vehicle, and wherein the interval of time is decreased when the robotic vehicle enters a roadway; and transmit, by the computer system and to the chassis controller, the emergency trajectory each time the emergency trajectory is updated, wherein the chassis controller is separate from the computer system, has a lower failure rate than the computer system, and comprises at least one second processor and a second memory storing a plurality of executable instructions which, when executed by the at least one second processor of the chassis controller, cause the chassis controller to:

determine whether any communication error has occurred between the computer system and the chassis controller;

select the base trajectory or the emergency trajectory, wherein the base trajectory is selected when no communication error has occurred between the chassis controller and the computer system, and wherein the emergency trajectory is selected after determining that a communication error has occurred between the computer system and the chassis controller; and execute the selected trajectory, thereby causing the robotic vehicle to travel along the selected trajectory.

16. The robotic vehicle of claim 15, wherein the instructions that cause the chassis controller to cause the robotic vehicle to travel along the emergency trajectory comprise instructions that cause the robotic vehicle to travel along the emergency trajectory using a subset of the plurality of sensors.

17. The robotic vehicle of claim 16, wherein the subset of the plurality of sensors comprises at least one accelerometer, at least one odometry sensor, and at least one ultrasonic sensor.

18. The robotic vehicle of claim 15, wherein the emergency trajectory is configured to cause the robotic vehicle to navigate to a closest safe area in a current direction of travel of the robotic vehicle.

* * * * *